United States Patent [19]

Meyerhoff et al.

[11] Patent Number: 4,799,825
[45] Date of Patent: Jan. 24, 1989

[54] OIL TRANSFER SYSTEM

[76] Inventors: Shirley B. Meyerhoff, 400 Bellevue Ave., Newport, R.I. 02840; Charles W. Quellette, Portsmouth, R.I.

[21] Appl. No.: 690,865

[22] Filed: Jan. 11, 1985

Related U.S. Application Data

[63] Continuation of Ser. No. 559,408, Dec. 8, 1983, abandoned, which is a continuation of Ser. No. 365,800, Apr. 5, 1982, abandoned.

[51] Int. Cl.$^4$ ............................................. B63C 11/10
[52] U.S. Cl. .................................... 405/188; 114/230; 114/294; 114/313; 137/236.1; 367/6; 367/131; 367/137; 441/5
[58] Field of Search ............... 114/313, 230, 257, 312, 114/321, 258, 293, 334, 338; 441/4, 5; 367/6, 137, 131; 340/851; 405/188, 189, 190; 212/154; 137/899.2, 236.1

[56] References Cited

U.S. PATENT DOCUMENTS

| 638,342 | 12/1894 | Lake | 114/334 |
|---|---|---|---|
| 736,432 | 8/1903 | Owens | 340/851 |
| 2,912,952 | 11/1959 | Simmons | 244/114 R |
| 2,946,605 | 7/1960 | Mosher | 244/135 A |
| 3,267,417 | 8/1966 | Galloway | 367/6 |
| 3,464,466 | 9/1969 | Bryan | 114/257 |
| 3,550,388 | 12/1970 | Smith et al. | 405/188 |
| 3,559,161 | 1/1971 | Raudsep | 367/137 |
| 3,583,445 | 6/1971 | Harbonn et al. | 114/257 |
| 3,624,598 | 11/1971 | Foster | 244/114 R |
| 3,646,771 | 3/1972 | Greene | 405/189 |
| 3,656,308 | 4/1972 | Serrano | 405/189 |
| 3,680,714 | 8/1972 | Holmes | 212/154 |
| 3,865,060 | 2/1975 | Bastide | 114/338 |
| 4,148,107 | 4/1979 | Karl et al. | 441/3 |
| 4,254,730 | 3/1981 | Crenshaw | 114/294 |

FOREIGN PATENT DOCUMENTS 2044707 10/1980 United Kingdom ............... 114/230

Primary Examiner—Joseph F. Peters, Jr.
Assistant Examiner—Thomas J. Brahan
Attorney, Agent, or Firm—Wolf, Greenfield & Sacks

[57] ABSTRACT

An underwater fuel transfer system for the transfer of liquid fuels such as crude oil from an off-shore underwater mooring to a submerged submarine oil tanker. There is provided a berthing guidance and control system including permanently moored acostic transponders interrogated by the tanker sonar equipment to provide input commands for azmith control along the on-tack position in conjunction with speed controls. The system also includes an arrestor mooring apparatus for decelerating the tanker as the tanker approaches the underwater station. This underwater station has the dual function of providing mooring for the tanker and also reception of the tanker oil transfer device.

30 Claims, 8 Drawing Sheets

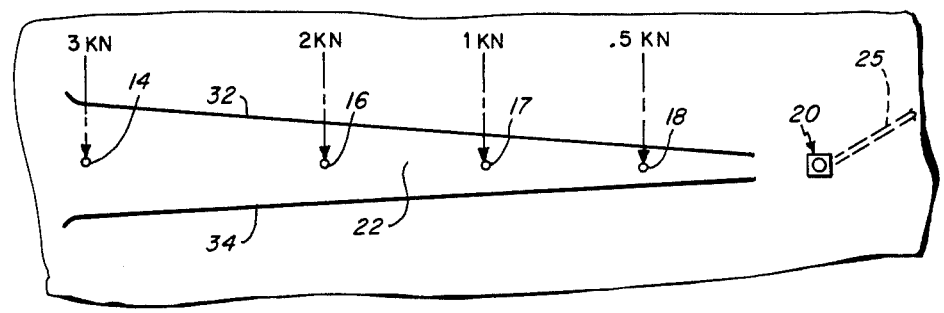
Fig. 3A
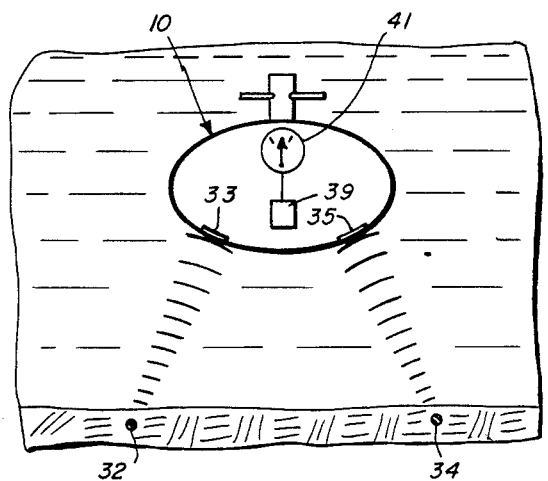
Fig. 3B
Fig. 3C
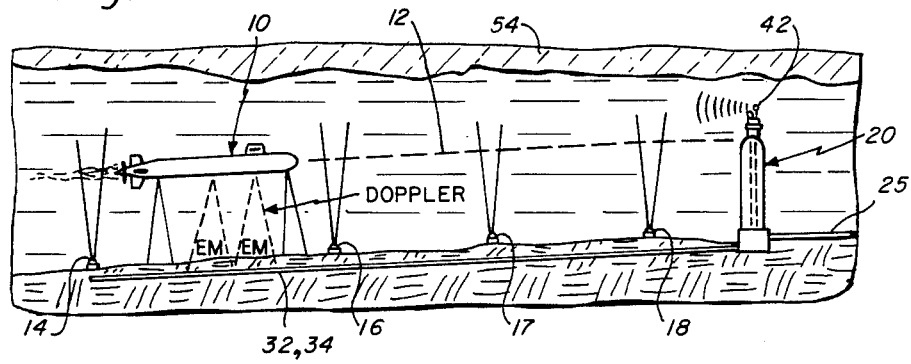

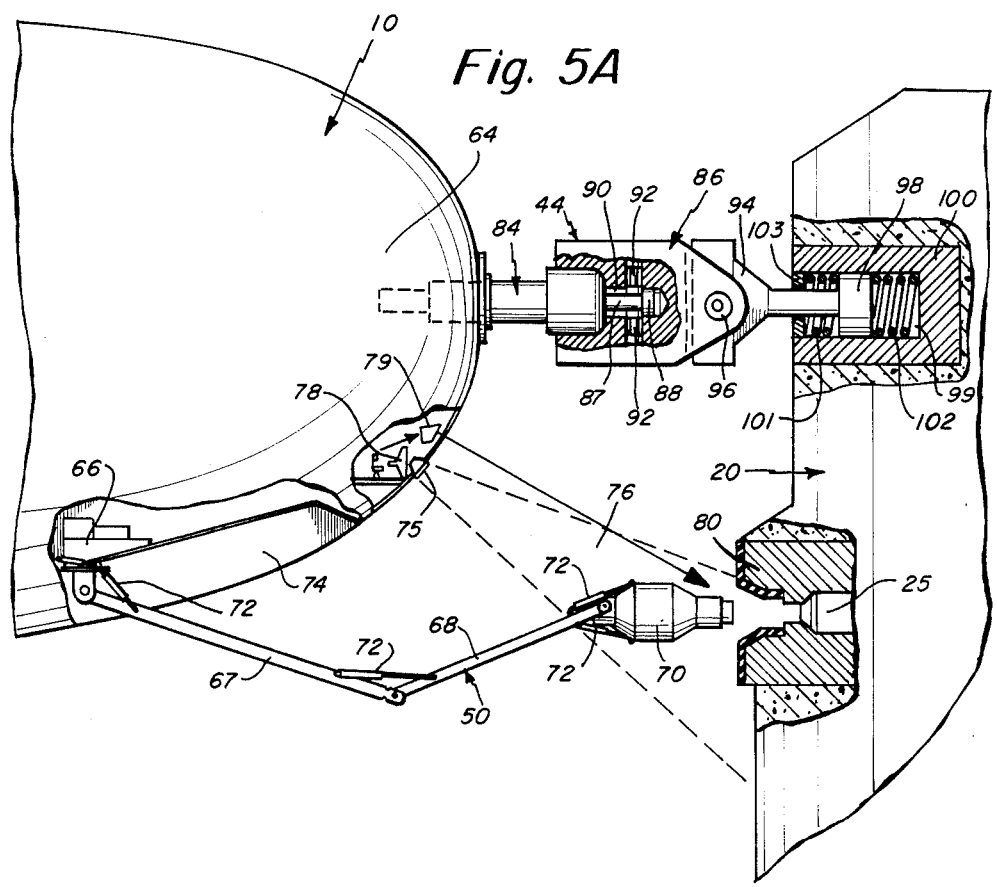

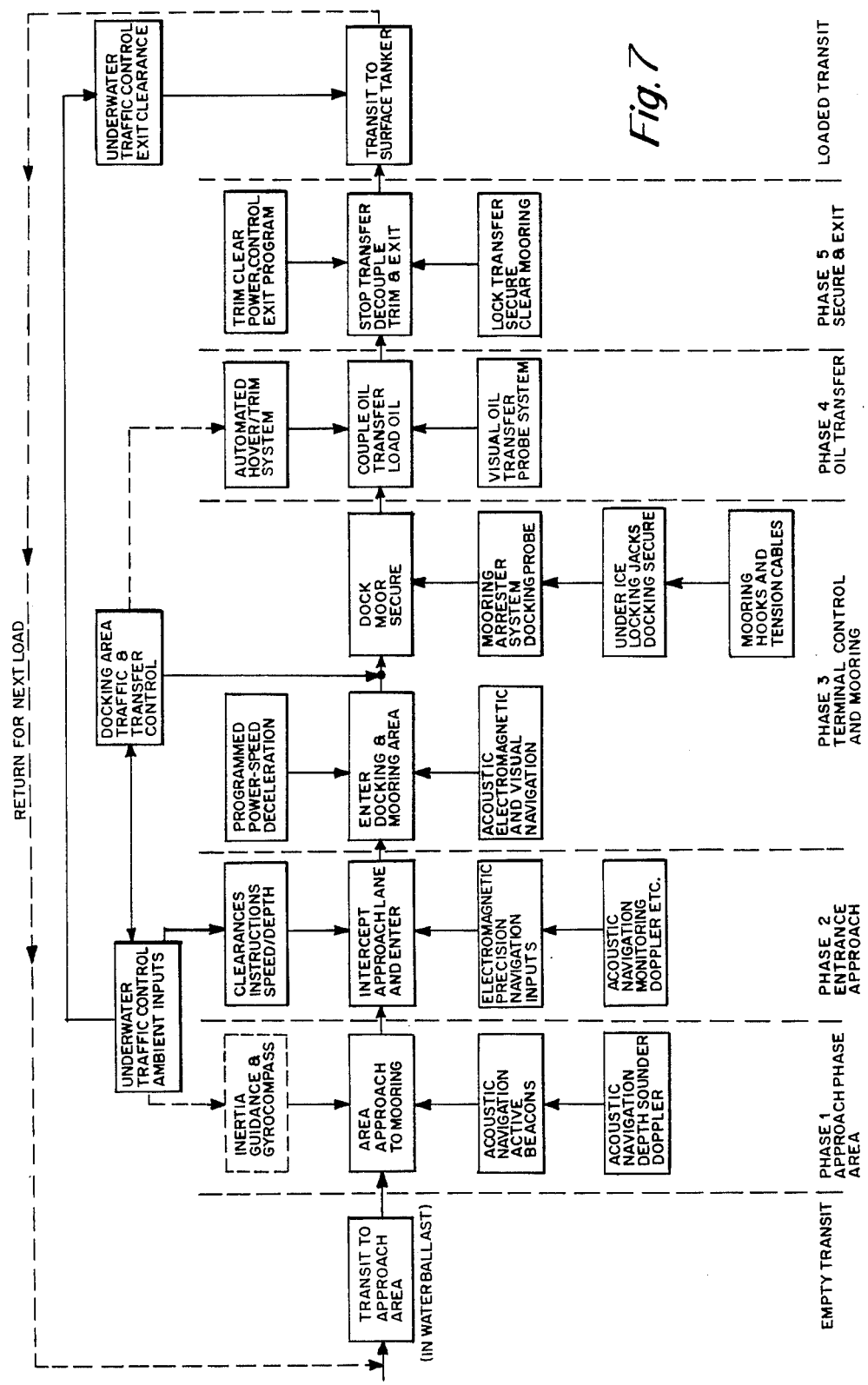

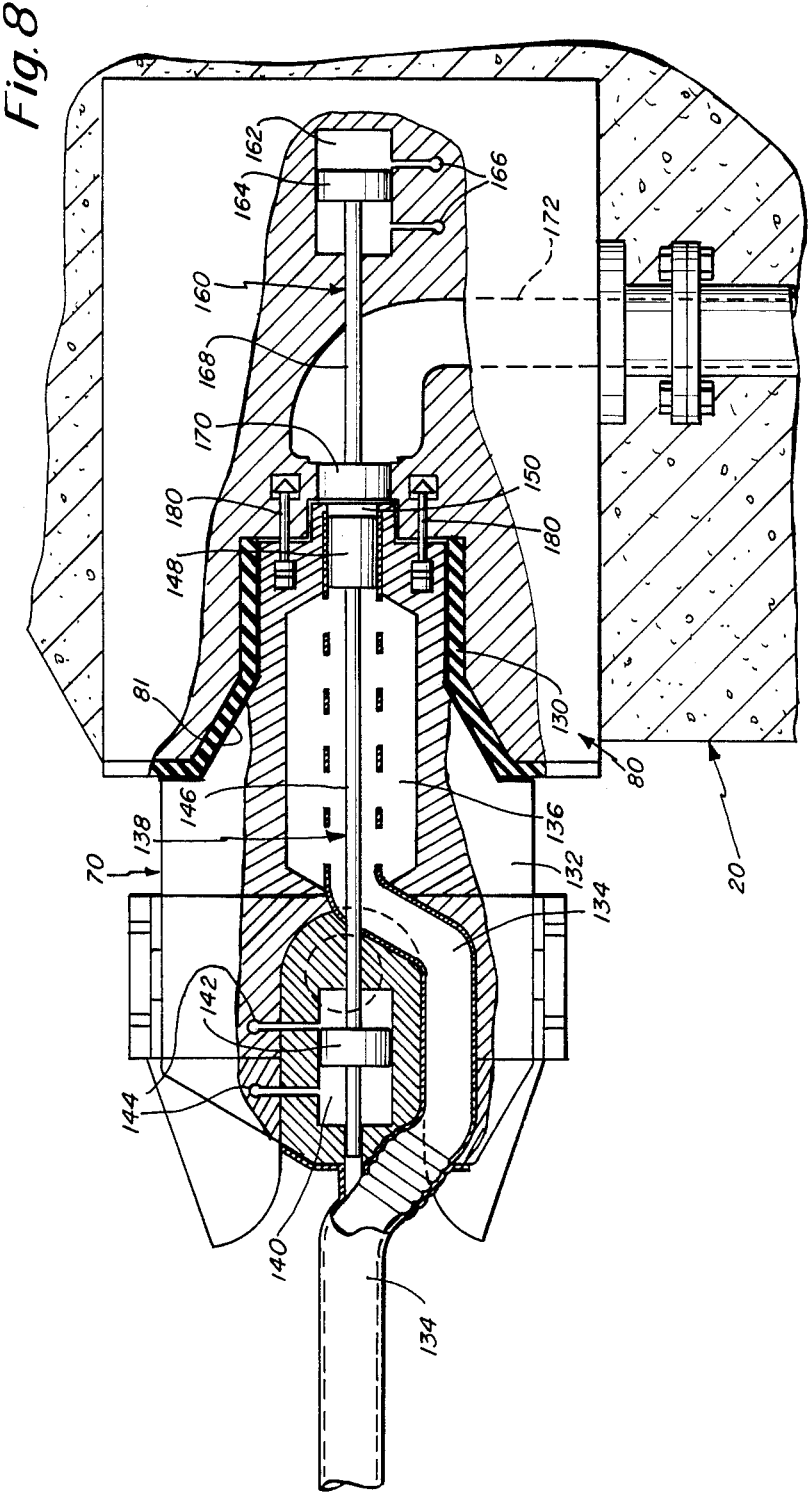

OIL TRANSFER SYSTEM

This application is a continuation of application Ser. No. 559,408, filed Dec. 8, 1983, now abandoned, which is a continuation of Ser. No. 365,800, filed Apr. 5, 1982, now abandoned.

INTRODUCTION

The present invention relates to a submarine tanker underwater oil transfer system. More particularly, the present invention pertains to a no-spill, underwater, oil transfer system and associated method characterized by the off-shore, underwater mooring, loading, and unloading of petroleum or gaseous cargo from submarine oil tankers, piped from land based or sea based sources or storage sites. The system and apparatus of this invention has particular application in the oil industry in connection with the commercial transportation of crude oil from the frozen Arctic Ocean regions by means of a submarine specifically adapted in accordance with the invention for commercial crude oil transportation. In addition to use in frozen regions such as the Arctic Ocean region, the apparatus and system of this invention also has application for the loading and unloading of submarine tankers in other areas particularly ones that are inaccessible or hazardous for the surface loading of volatile petroleum products.

Submarines, and in particular nuclear submarines presently are extensively used primarily only for military purposes. However, in accordance with the present invention it is a broad purpose thereof to use submarines on a commercial basis primarily for the transportation of crude oil from frozen regions such as the Arctic regions. The system of the present invention is the only viable means of meeting the transportation needs for new discoveries of major oil areas proliferating in the Arctic islands wherein the construction of pipelines and port facilities is physically and economically unfeasible. This solution to the transportation of petroleum products from such inaccessible regions represents an answer to the government injunction against the 800 mile Alaskan oil pipeline from Prudhoe Bay to Port Valdez because of pollution hazards and environmental risks. Moreover, with the use of submarine tankers there would be a substantial elimination of opposition from organized conservationists and lobbyists. Also, this would overcome problems with regard to the Eskimo claims for land and trespass rights. In this regard, attempts at transportation by other water vessels such as an ice breaking surface tanker have proven to be unworkable.

OBJECTS OF THE INVENTION

Accordingly, it is an object of the present invention to provide an automated system for berthing a submarine oil tanker under frozen seas.

Another object of the present invention is to provide an automated system in accordance with the preceding object and which provides for the accurate berthing to a predetermined berthing site.

Still another object of the present invention is to provide a system, apparatus, and associated method for establishing a fail-safe, non-pollutant, fluid conductive interconnection with an underwater pumping apparatus that is connected to a shore-based oil site via pipeline typically laid on the ocean floor.

A further object of the present invention is to provide a valving means which is automatically operated for controlling ingress or egress of oil to and from the tanker.

Still another object of the present invention is to provide a submarine tanker oil transfer system having acoustic navigation and terminal guidance apparatus.

Still a further object of the present invention is to provide a submarine tanker underwater transfer system having submarine hull alignment apparatus and arrester mooring apparatus along with underwater lazer and television controls to assist in docking and proper alignment of the submarine tanker with its mooring structure.

A further object of the present invention is to provide a submarine tanker underwater fail-safe oil transfer system having an extendable/retractable oil transfer probe with associated control and display equipment incorporated in the submarine tanker.

Still a further object of the present invention is to provide a submarine tanker underwater transfer system incorporating a hydraulically controlled, pressure sealed, oil transfer head.

Another object of the present invention is to provide a submarine tanker underwater oil transfer system characterized by a combination offshore oil transfer station and submarine mooring structure.

A further object of the present invention is to provide a submarine, preferably a nuclear submarine, that may be used for dual purposes which is preferably a nuclear submarine capable of use for a military purpose and substantially at the same time useable as a submarine tanker for crude oil or gas transportation. In addition to transportation of crude oil, the submarine is also particularly adapted for transportation of liquified natural gas (LNG).

Another object of the present invention is to provide an underwater submarine oil transfer system useable as a commercial oil tanker particularly in frozen regions of the earth.

A further object of the present invention is to provide an oil transfer system as in the preceding object as a system and apparatus for the accurate docking and loading (unloading) to and from the submarine tanker.

ADVANTAGES OF THE INVENTION

One advantage of the present invention is that it provides a means for mooring and loading submarine oil tankers under ice layers typically found in such areas as the Arctic area. For example, Prudhoe Bay, Alaska is a site of a recent Alaskan oil strike.

Another advantage of the present invention permits direct loading from shore to ship, thereby eliminating the need for constructing port facilities which are typically in a shallow bay area. Constructing port facilities particularly in shallow bay areas is enormously costly.

The system of the present invention also has as an advantage, the fact that it allows year-round efficient, all weather loading operations at a constant temperature on the order of 28° F. protected from ice, winds, waves and storms.

Another advantage of the invention is that it substantially eliminates oil leakage and oil spills normally encountered in surface loading operations.

Still another advantage of the present invention is that it provides a much more feasible means of transporting oil from the Arctic islands to the marketplace, particularly in comparison with the construction of expensive pipelines. The system and apparatus of the present invention would have eliminated the need for the controversial Alaskan pipeline with its attendant ecological risks, legal entanglements and costly land claims.

A further advantage of the invention is that it eliminates the explosion hazards of loading/unloading operations associated with surface tankers, particularly in higher temperature regions.

BRIEF SUMMARY OF THE INVENTION

To satisfy the foregoing and other objects and advantages of this invention, there is provided an underwater fuel transfer system preferably for the transfer of crude oil from an off-shore, underwater, mooring to a submerged submarine oil tanker. The invention has particular application in the oil industry in connection with the transportation of crude oil from the frozen Arctic Ocean regions. The concept of this invention incorporates a system for berthing a submarine oil tanker to a predetermined mooring site employing a berthing, guidance and control system including permanently moored acoustic, omni-directional transponders interrogated by the tanker sonar equipment to obtain range and directional inputs for controlled, on-course entrance to the berthing zone. The transponders or sensors on the submarine provide input commands for azmith control along the on-track position in conjunction with timed speed control. An arrester mooring system is employed comprising arrester mooring cables fixed to the ocean floor within the berthing zone, arrester hooks deployed from the submarine, a mooring device extending from the tanker bow, a mooring structure incorporating a mechanical locking device, and such other apparatus as underwater light beacons, and underwater television monitors with a lazer beam assist to provide proper guidance and control so as to align and dock the tanker to the combined mooring structure/oil transfer station. Stabilization is maintained during the oil loading or unloading operation by water reaction controls and extendable ice locater jacks. The oil transfer system comprises an underwater oil transfer station, an oil transfer probe extending from the tanker hull, operator controls, and an oil transfer head with pressure seals, transfer pipes and valving.

BRIEF DESCRIPTION OF THE DRAWINGS

Numerous other objects, features and advantages of the invention should now become apparent upon a reading of the following detailed description taken in conjunction with the accompanying drawing, in which:

FIGS. 3A, 3B and 3C show the submarine tanker approaching the mooring structure/oil transfer station with the use of the undersea directional lazer beam/terminal guidance system of this invention;

FIGS. 5A and 5B illustrate further detail of the oil transfer probe and associated mooring device and oil transfer station;

FIG. 7 is a block diagram of sequential task flow of the various automated sub systems and performance monitoring of the transfer system; and FIG. 8 is a cut-away detailed drawing of the non-pollutant oil transfer head and associated valving.

DETAILED DESCRIPTION

Figure 1:
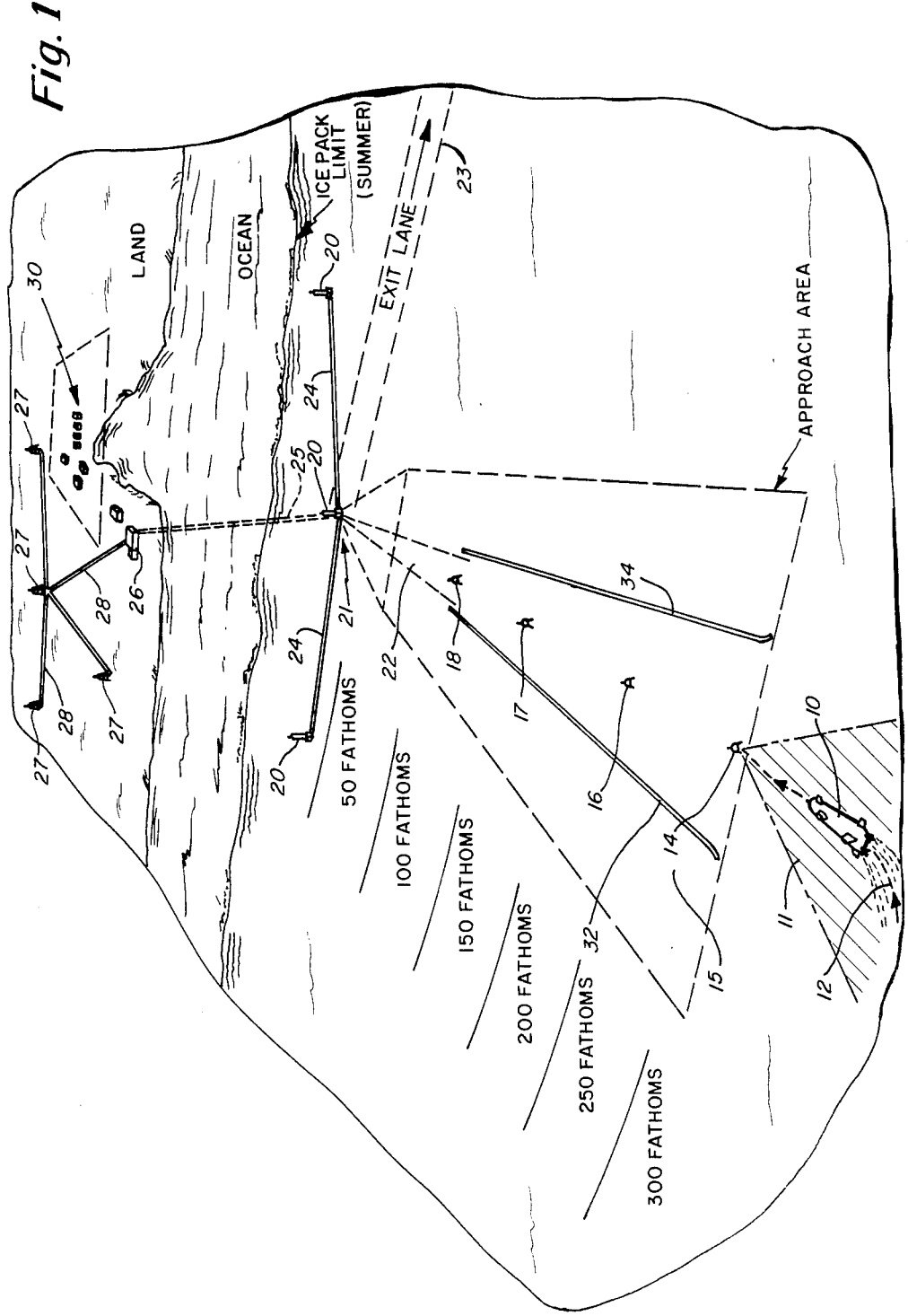
FIG. 1 is a diagrammatic elevation view of a submarine tanker approaching an undersea oil site station connected to a shore-based source.

FIG. 1 is a diagrammatic elevation view showing the submarine tanker 10 approaching an undersea oil site station 20. In FIG. 1 the submarine tanker 10 is shown in the approach sector 11 progressing along a path 12 toward the high power acoustic beacon 14 at the entrance to the approach area 15 generally shown in dotted outline in FIG. 1. Terminal navigation to line up the tanker with the underwater oil transfer station 20 is accomplished by homing onto the directional acoustic beacon 14 which is aligned with the tidal flow to avoid drift when approaching the docking lane. The acoustic beacon 14 may be stationed, for example, 2-3 miles from the mooring/oil transfer site 21. FIG. 1 illustrates the final approach lane 22 leading to the station 20 and the exit lane 23, both of these lanes being shown in dotted outline. In addition to the high power acoustic beacon 14 there are also provided intermediate beacons including an outer approach beacon 16, a middle approach beacon 17, and an inner approach beacon 18. The beacons 16, 17, and 18 may be of lower power than the beacon 14. A panoramic view of the approach area 15 is displayed in the command and control room of the submarine tanker all of which is shown and described in detail hereinafter.

FIG. 1 also illustrates oil pipelines 24 which interconnect various underwater stations 20, and an oil pipeline 25 that connects from the centrally disposed station 20 along the ocean bottom back to the oil transfer station 26. There are additional pipes 28 that connect from multiple oil sites 27. At each site there may be provided a conventional oil pump for pumping the oil from underground to the transfer station 26. At the harbor there is also provided a harbor site headquarters 30.

Once the tanker 10 is over the acoustic approach beacon 14, then control of the movement of the tanker is with the use of a set of submerged cables 32 and 34. These cables have electrical current flowing therethrough for establishing thereabout a magnetic field. Thus, each of the cables transmits a specific radial magnetic field for guiding the submarine tanker via the tanker's control and guidance system along the approach corridor into the berthing zone.

At the berthing zone in the final approach lane 22 an arrester mooring technqiue is employed for decelerating the submarine tanker 10. In this connection reference is made to FIGS. 2A and 2B which show arrester mooring cables 36 and 37 extending from the underside of the tanker 10. These each may be bifurcated cables. At the rear of the submarine there is also provided a bifurcated drag cable 38. Each of the cables 36, 37, and 38 have at their ends associated hooks 36A, 37A and 38A, respectively. Secured to the bottom of the ocean are anchor members 40. Each anchor member 40 may comprise transversely spaced anchors having a cable therebetween with which each of the respective hooks engages. The cables and associated hooks are disposed relative to the anchor members so that the hook 38A engages first, the hook 36A second, and the hook 37A third. This arrester mooring system provides for a deceleration from 1 to 0.1 knots.

Figure 2A:
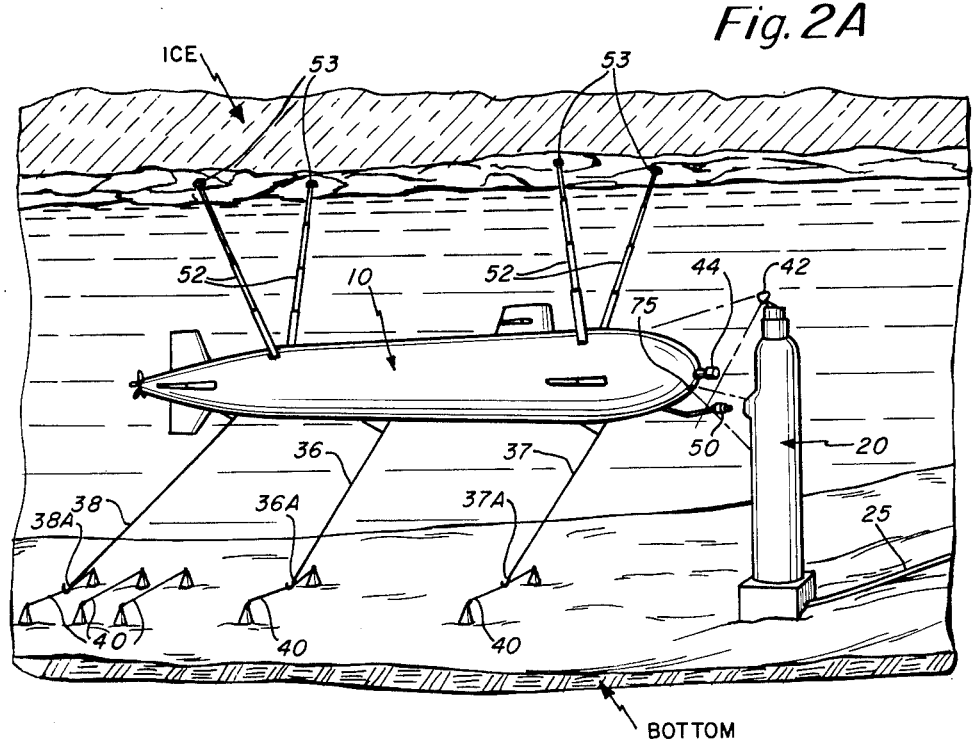
FIGS. 2A and 2B are perspective and plan views of a tanker moored under an ice layer showing the oil transfer probe extending from the submarine hull at the combination mooring structure/oil transfer station.
Figure 2B:
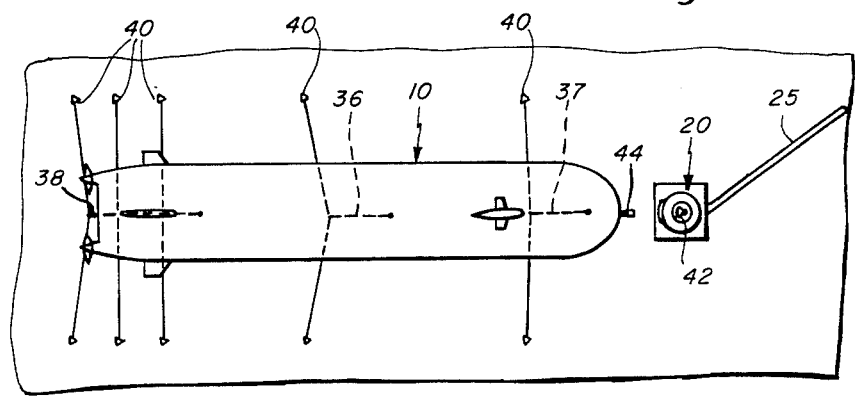

FIGS. 2A and 2B also illustrate the combination mooring structure and oil transfer station 20 with the pipeline or lines 25 connected thereto. Parts of the system shown in FIGS. 2A and 2B are shown in further detail hereinafter. It is noted that the station 20 carries a light 42 at the top thereof. FIG. 2A also shows the mooring device 44 and oil transfer probe 50, both of which are shown in more detail hereinafter.

FIG. 3A is a schematic plan view of the approach lane 22 showing the submerged cables 32 and 34 along with the plurality of localizer beacons. Also depicted in FIG. 3A is the station 20 and associated pipeline 25.

FIGS. 3B and 3C illustrate the approach of the submarine tanker 10 along the submarine track 12 as indicated by the dotted line in FIG. 3C.

In the approach area 15 there is provided precision, underwater terminal navigation and guidance with the aid of permanently moored acoustic omni-directional, narrow beam transponder beacons previously referred to as beacons 14, 16, 17 and 18. These beacons are interrogated by the tanker sonar equipment to obtain range and directional inputs for controlled, on-course entrance to the berthing zone. A beamformer sonar system, combined with half-beam training beams providing Scan Sector Indication (SSI)/Bearing Deviation Information (BDI) and Range Bearing Information (RBI), is utilized to supply input to the steering and command computers aboard the submarine for proper speed, attitude course control. As indicated previously, in addition to the localizer beacons, there are the two converging cables 32 and 34 fixed and embedded in the ocean floor and having associated therewith separate electromagnetic fields, the strength of which is measured by sensor receivers on the lower hull of the submarine. FIG. 3B illustrates the sensor receivers 33 and 35 associated respectively with the cables 32 and 34. These sensors 33 and 35 couple to a comparator receiver 39 which compares the strength of each of the signals from the receivers 33 and 35. It is noted that the comparator 39 couples to a left/right meter 41 for giving a visual indication of whether the path of travel is deviating from one intermediate the cables 32 and 34. The strength from one of the sensors 33 is stronger than from the other. This will be sensed by the comparator 39 and provide an indication on the meter 41 that movement is to be made in one direction or the other so as to equalize the signals received at both sensors 33 and 35. The signals received from the receivers 33 and 35 may also be used to control the timed speed control program associated with operation of the vessel.

As the submarine is approaching its mooring, underwater light beacons such as the light 42 directly on the station 20 permit visual alignment of the tanker axis by means of underwater television monitors preferably aided by a lazer system for checking hull alignment and providing inputs to the tanker guidance and control system to obtain proper alignment. An integrated doppler sonar/fathometer provides proper speed/time deceleration programs to provide an exact speed and positioning envelope for deceleration and stopping at the mooring/oil transfer station 20.

Figure 4A:
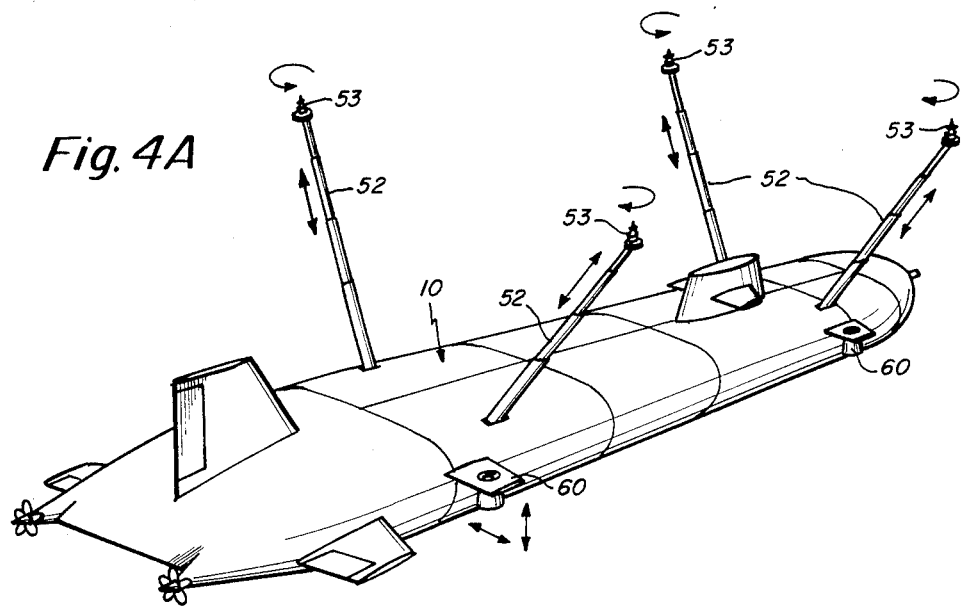
FIGS. 4A, 4B, 4C and 4D illustrate the tanker and the technique for stabilization thereof employing an automatic trim and buoyancy correction technique.
Figure 4B:
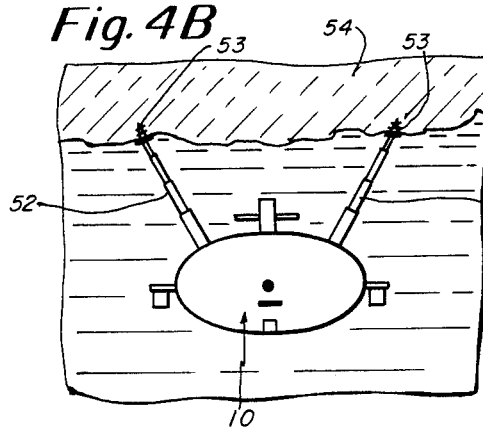
Figure 4C:
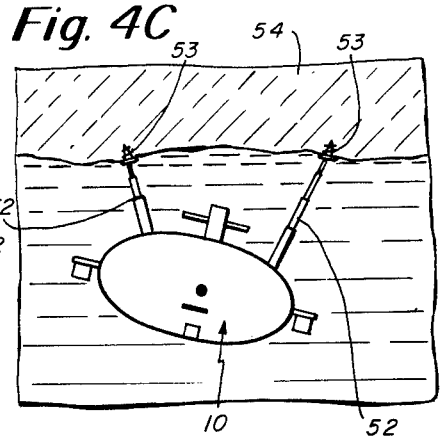
Figure 4D:
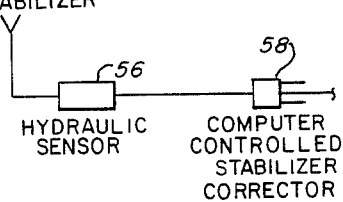

After the tanker is brought to a stop with the use of the arrester technique previously described and illustrated in FIGS. 2A and 2B, then the tanker is locked to the mooring station as will be described hereinafter. The ice locking jacks as illustrated in FIGS. 4A, 4B and 4C are then extended and worked into position to stabilize the tanker. FIG. 4A shows the jacks 52 in an extended position with a securing auger 53 at the end of each of the jacks 52. The auger 53 is for drilling into the overhead ice layer 54 illustrated in FIGS. 4B and 4C. FIG. 4B shows the jacks in their typical extended position with the vessel properly balanced. FIG. 4C shows an off-keel position. FIG. 4D illustrates in the block diagram form the computer controlled trim and buoyancy correction system aboard the vessel. This includes a hydraulic sensor 56 which connects from an extended/compressed piston stabilizer associated with the jacks 52. The hydraulic sensor 56 couples to a computer controlled stabilizer corrector 58 which reads the hydraulic pressure to correct for an off-keel position so as to stabilize the vessel to the on-keel position illlustrated in FIG. 4B. For this purpose, as illustrated in FIG. 4A, there are provided thrusters 60 fore and aft of the vessel. Such thrusters are preferably provided on both sides of the vessel. Once the jacks are properly drilled into place, the system is placed in a hydraulically controlled automatic mode in which the hydraulic sensor 56 is operated for providing buoyance balancing during transfer of the crude oil or other product. The jacks 52 are shown in FIG. 4A in their extended position. It is understood that they may also be retracted substantially totally into the submarine so that they do not impede the normal movement of the submarine. Also, the mooring cables and drag cable are also preferably held within the submarine except for times when they are required for use such as in rapidly decelerating the vessel as illustrated in FIGS. 2A and 2B.

Figure 6:
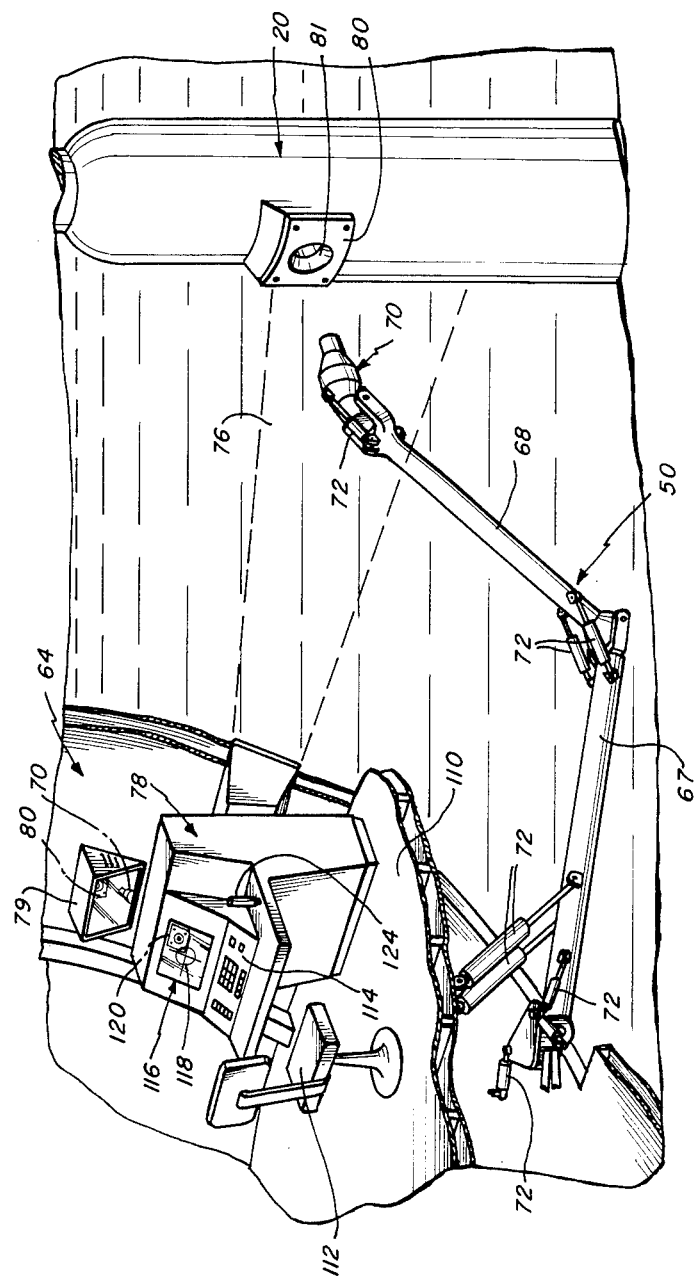
FIG. 6 is a perspective view of the articulated oil transfer apparatus with visual guidance and control.

FIG. 5A is a cut-away side view showing further details of the oil transfer probe 50, mooring device 44, and mooring/transfer station 20. FIG. 5A illustrates the super tanker bow 64 which supports a hydraulic unit 66 which in turn supports the oil transfer probe 50. The probe 50 includes links 67 and 68 which are preferably hollow carrying a suitable conduit for the transfer of oil from the oil transfer device 70 through the links 67 and 68 to a substantial size storage compartment (not shown) for the crude oil within the submarine tanker 10. There are a plurality of control jacks 72 associated with the hinged boom formed in part by the links 67 and 68. The oil transfer device 70 couples to the link 68 and it is noted that there are two control jacks 72 for properly supporting the oil transfer device 70. The oil transfer device 70 is also shown in FIG. 6 but is shown in detail and discussed hereinafter in connection with FIG. 8. The bow 64 of the tanker 10 is provided with a storage recess 74 into which the oil transfer probe folds for storage. In FIG. 5A the oil transfer boom and associated transfer device 70 are shown in extended position with the device 70 about to enter into the receiving member 80 at the transfer station or tower 20.

FIG. 5A also shows a high wattage, high intensity light source 75 which is adapted to direct a beam 76 of light toward the station 20 in the area of the transfer device 70 and its associated reception member 80. FIG. 5A also illustrates the control console 78 and display device 79 both of which are shown in further detail in FIG. 6.

FIGS. 5A and 5B illustrate the mooring device 44 which is basically constructed of two mating parts including a male mooring member 84 and a female mooring member 86. The male mooring member 84 is fixedly secured to the most front portion of the bow of the tanker. The very remote end of the mooring member 84 carries a locking shaft 87 with associated enlarged end 88. The shaft 87 and end 88 are received in the passageway 90 in the female mooring member 86. The mooring member 86 also supports externally controlled hydraulic locks 92 adapted to lock the mooring member 84 in the mooring member 86. The hydraulic locks may be remotely activated such as from the harbor headquarters site 30 shown in FIG. 1. When the locks 92 are activated, they move toward the shaft 87 locking the mooring members together providing an interference fit against the end 88 associated with the mooring member 84.

The mooring member 86 is pivotally connected to the piston 94. For this purpose there is provided a pin 96 as illustrated in FIGS. 5A and 5B. A member 94 has a piston end 98 that is fitted within the hollow chamber 99 defined by support member 100. Member 100 carries the piston 98 and springs 101 and 102 which are disposed on either side of the piston 98. There may be provided a securing ring 103 for holding both of the springs and piston in place. This arrangement permits limited axial movement of the mooring device. However, the mooring device 44 is held substantially fixed. The mooring device is engaged with the two members 84, 86 interlocking with each other and with the hydraulic locks engaged prior to operation of the hydraulic boom 50 and associated oil transfer device 70.

FIG. 6 is a perspective view showing the oil transfer probe 50 and associated controls in more detail. This view shows a portion of the bow 64 cut-away showing the floor platform 110 upon which the console 78 rests. There is a chair 112 for the operator. The console 78 includes a keyboard and control panel 114 and a television monitor 116. The monitor shows the steering cursor 118 and the simulated target 120. The control panel 114 is operated by the operator to align the steering cursor and the target. The visual window 79 shows illustrated therein, the device 70 and associated reception member 80. FIG. 6 also illustrates the steering grip 124 which may be in the form of a joy stick used in controlling the steering of the oil transfer probe so that the steering cursor 118 properly aligns with the target 120 on the television monitor 116.

FIG. 8 is a more detailed diagram of the oil transfer device or head 70. In FIG. 8 the head 70 is shown in a position interlocked with the reception member 80 at the station 20. The aperture 81 in the member 80 is lined with an oil seal 130.

The device 70 includes a housing 132 for accommodating the oil pipe 134. The pipe 134 leads to an internal chamber 136 in which is also supported a valving arrangement including a control valve 138. The control valve 138 includes a valve chamber 140, piston 142 and hydraulic lines 144. The piston 142 connects to an operating rod 146 which in turn connects to a closure member 148. The closure member 148 is adapted to close or open a passageway 150 in the housing 132. In the position shown in FIG. 8 the closure member 148 is in its closed position preventing any oil passage from the member 80 to the device 70. The rod 146 and member 148 are moved to the left in FIG. 8 to open valve 138.

The reception member 80 similarly has a control valve 160 which includes a valve chamber 162, a piston 164, and hydraulic lines 166. The piston 164 has a control rod 168 connected therefrom coupling to a closure member 170. In FIG. 8 the closure member 170 is shown in its closed position so that oil is blocked from the oil duct 172. The hydraulic lines 144 and 166 shown in FIG. 8 may be remotely controlled such as from a headquarters site. Alternatively, particularly the hydraulic lines 144 may be controlled from the submarine itself.

FIG. 8 also shows the locking pins 180 which extend from the end of the housing 132 and which are received in appropriate apertures in the reception member 80.

After the tanker has been properly berthed, as described hereinbefore, and has been mechanically docked, the oil transfer probe 70 is extended from the hull and guided from the tanker control console 78 so that the head 70 engages with the reception member 80 at the mooring/transfer station 20. This is accomplished with visual assistance via the television monitor 116 shown in FIG. 6. The transfer head 70 may house five transfer pipes and associated valves with four locks 180 beng employed. The transfer head is controlled and optically steered into the lock guide holes by the tanker control operator at the control and command display console. The control is such as to provide movement in azmith, elevation, pitch, and roll.

Upon insertion of the transfer head locking pins 180, this will automatically activate and cause engagement with the pressurized rubber seal 130. Subsequently, the main transfer valves are open by hydraulic piston action on command from, preferably, the tanker control room. Oil transfer pressure is maintained below hydrostatic pressure so that no oil leakage occurs from any part of the system under water. Because the pressure of the sea water is greater than the pumping pressure of oil, the sea water actually functions as a further seal causing water to flow into any breaks or cracks in the system.

During all stages of system operation, the fail safe system provides continuous performance monitoring in fault localization with audio/visual alarm systems and automatic system shut-off in the event of breaks, leaks, or faulty operation.

On completion of oil transfer, the valves, such as the valves 138 and 160 illustrated in FIG. 8, are closed, the seals unlocked and the oil transfer master valve is shut-off. When all pistons are in their cleared position, the mechanical lock catches are released and the probe is withdrawn with no danger of oil spillage. The transfer probe is then retracted and the tanker is ready for aft movement and transit. The transfer of oil to surface tankers or shore stations at the end of journey is accomplished with basically the same technique for unloading from the submarine tanker.

FIG. 7 is a block diagram of the sequential task flow of the various sub-systems. In FIG. 7 the activities are basically separated into five phases as indicated, including a first phase which is the approach phase and a second phase which is the entrance approach. The third phase shows the operations for terminal control and mooring. The fourth phase is the oil transfer phase and the fifth phase is the secure and exit phase of operation. These various blocks show the different operations commencing with entry to the approach area to exit from the oil transfer station.

Having described one embodiment of the present invention, it should now be apparent to those skilled in the art that numerous other embodiments are contemplated as falling within the scope of this invention.

What is claimed is:

1. A submarine tanker liquid fuel transfer system for the transfer of liquid fuel at a location under an ice layer comprising;

an underwater station having means for receiving the liquid fuel for transfer to the submarine, means at the ocean bottom defining an approach and for guiding the submarine tanker in the direction of said underwater station, means for decelerating the submarine tanker as it approaches the underwater station, a liquid fuel transfer device on board the submarine tanker and having an extended position and a retracted position, a first mooring member on board the submarine tanker, said underwater station including a second mooring member for interlocking with said first mooring member, and means for receiving said liquid fuel transfer device in its extended position, means for first locking in engagement said first mooring member with said second mooring member, means for thereafter moving said liquid fuel transfer device to its extended position to engage with said underwater station receiving means, and means for stabilizing the submarine once the mooring members are interlocked including locator jacks extending upwardly from the submarine tanker for interengagement with the bottom of the ice layer, said locator jacks including at least one jack on both port and starboard sides of the submarine tanker for maintaining the submarine tanker at a position spaced below the ice layer, said means for stabilizing further including means for extending and retracting said jacks to maintain the submarine tanker in a substantially horizontal lay below and spaced from the ice layer, said first and second mooring members comprising a resilient piston means and associated swivel joint for enabling limited tanker movement while maintaining proper berthing.

2. A submarine tanker liquid fuel transfer system as set forth in claim 1 wherein said means for guiding the submarine tanker comprises at least one underwater high power acoustic beacon.

3. A submarine tanker liquid fuel transfer system as set forth in claim 2 including a series of beacons disposed along a substantially linear path leading to the underwater station.

4. A submarine tanker liquid fuel transfer system as set forth in claim 3 wherein the beacons are at different water depths.

5. A submarine tanker liquid fuel transfer system as set forth in claim 1 wherein said means for guiding includes a pair of converging magnetic field conductors and means for establishing a magnetic field thereabout.

6. A submarine tanker liquid fuel transfer system as set forth in claim 5 including a pair of magnetic field sensors on board the submarine tanker and adapted to receive signals from the respective field conductors, and a comparator for comparing the outputs from the sensors to control the submarine left or right upon detection of a difference in comparison between signals.

7. A submarine tanker liquid fuel transfer system as set forth in claim 6 including a left/right meter coupled from said comparator to display direction of submarine turning.

8. A submarine tanker liquid fuel transfer system as set forth in claim 7 wherein said pair of conductors are embedded in the ocean bottom.

9. A submarine tanker liquid fuel transfer system as set forth in claim 5 comprising a series of acoustic locator beacons disposed substantially linearly and intermediate the magnetic field conductors.

10. A submarine tanker liquid fuel transfer system as set forth in claim 1 wherein said means for decelerating includes at least one cable extending from the submarine tanker having a hook and anchor means on the ocean bottom with which the book is engageable.

11. A submarine tanker liquid fuel transfer system as set forth in claim 10 including a plurality of cables and associated hooks and anchor means.

12. A submarine tanker liquid fuel transfer system as set forth in claim 1 including a television monitor and control console aboard the submarine tanker.

13. A submarine tanker liquid fuel transfer system as set forth in claim 1 including an auger at the end of the locator jack for drilling into the ice.

14. A submarine tanker liquid fuel transfer system as set forth in claim 1 wherein said first mooring member extends from the front of the bow of the submarine tanker, and said second mooring member is disposed above the means for receiving.

15. A submarine tanker liquid fuel transfer sytem as set forth in claim 14 wherein said first mooring member is a male member and said second mooring member is a female member.

16. A submarine tanker liquid fuel transfer system as set forth in claim 15 wherein said mooring members have remotely controlled interlock means.

17. A submarine tanker liquid fuel transfer system as set forth in claim 1 wherein said liquid fuel transfer device has a transfer head and a hinged boom.

18. A submarine tanker liquid fuel transfer system as set forth in claim 17 including valve means in said transfer head and valve means in said reception member.

19. A submarine tanker liquid fuel transfer system as set forth in claim 18 including means for locking the transfer head in the reception member.

20. A submarine tanker liquid fuel transfer system as set forth in claim 1 including a pair of locator jacks both port and starboard of the submarine tanker.

21. A submarine tanker liquid fuel transfer system as set forth in claim 20 wherein each locator jack includes an auger at its free end for securing into the underside of the ice layer.

22. A submarine tanker liquid fuel transfer system as set forth in claim 1 wherein said means for decelerating include at least one cable extending from the submarine tanker having a hook and anchor means on the ocean bottom with which the hook is engageable.

23. A submarine tanker liquid fuel transfer system as set forth in claim 22 including a plurality of cables and assciated hooks and anchor means.

24. A submarine tanker liquid fuel transfer system as set forth in claim 1 including thrusters on the submarine tanker for stabilizing the tanker.

25. A submarine tanker liquid fuel transfer system as set forth in claim 1 including a hydraulic sensor associated with each locator jack to sense pressure on the locator jack to control and maintain on-keel position.

26. A submarine tanker liquid fuel transfer system as set forth in claim 1 wherein the underwater station has means for defining a cylindrical port for receiving the piston means permitting the piston means to move under force of the tanker toward and away from the station.

27. A submarine tanker liquid fuel transfer system as set forth in claim 26 wherein said first mooring member has a male pin and said second mooring members has means for receiving the male pin supported from said piston means.

28. A submarine tanker liquid fuel transfer system for the transfer of liquid fuel at a location under an ice layer comprising;
- an underwater station having means for receiving the liquid fuel for transfer to the submarine,
- means at the ocean bottom defining an approach area and for guiding the submarine tanker in the direction of said underwater station,
- means for decelerating the submarine tanker as it approaches the underwater station,
- a liquid fuel transfer device on board the submarine tanker and having an extended position and a retracted position,
- a first mooring member on board the submarine tanker,
- said underwater station including a second mooring member for interlocking with said first mooring member, and means for receiving said liquid fuel transfer device in its extended position,
- means for first locking in engagement said first mooring member with said secong mooring member,
- means for thereafter moving said liquid level transfer device to its extended position to engage with said underwater station receiving means,
- means for stabilizing the sumbarine tanker once the mooring members are interlocked to maintain the submarine tanker in a substantially horizontal lay,
- said first and second mooring members comprising a resilient member adapted to enable the members to move longitudinally to permit limited tanker movement, and a swivel means to enable the tanker to move vertically to a limited extent.

29. A submarine tanker liquid fuel transfer system as set forth in claim 28 wherein the underwater station has means for defining a cylindrical port for receiving the piston means permitting the piston means to move under force of the tanker toward and away from the station.

30. A submarine tanker liquid fuel transfer system as set forth in claim 29 wherein said first mooring member has a male pin and said second mooring members has means for receiving the male pin supported from said piston means.

* * * * *